July 19, 1960  M. K. BERLYE  2,945,699
FURNITURE TRUCK

Filed Oct. 16, 1957  2 Sheets-Sheet 1

MILTON K. BERLYE
INVENTOR.

BY
Ashlan J. Harlan Jr.
ATTORNEY

July 19, 1960  M. K. BERLYE  2,945,699
FURNITURE TRUCK

Filed Oct. 16, 1957  2 Sheets-Sheet 2

MILTON K. BERLYE
INVENTOR.

BY
Ashlan J. Harlan Jr
ATTORNEY

United States Patent Office 2,945,699
Patented July 19, 1960

2,945,699
FURNITURE TRUCK
Milton K. Berlye, 36 York Ave., Monticello, N.Y.

Filed Oct. 16, 1957, Ser. No. 690,486

5 Claims. (Cl. 280—79.3)

The invention of the present application relates to trucks and is particularly concerned with trucks adapted for the convenient transportation and storing of folding chairs, folding tables and the like.

It is an object of the present invention to provide a truck of the character described on which folding chairs or the like may be easily and conveniently stacked and transported.

Another object of the present invention is to provide a truck of the character described which is stable and adapted for convenient operation whether fully or only partially loaded.

A further object of the present invention is to provide a truck of the character described which may be conveniently folded and stored when not in use.

Another object of the present invention is to provide a truck of the character described which has means for preventing chairs or the like stacked thereon from being dislodged.

Still another object of the present invention is to provide a truck of the character described on which folded chairs may be carried either on end or on their sides.

A still further object of the present invention is to provide a truck of the character described which is of simple, strong and rigid construction and is inexpensive to manufacture.

Other objects and advantages of the present invention will be apparent from the following description taken in conjunction with the following drawing in which.

Figure 1:
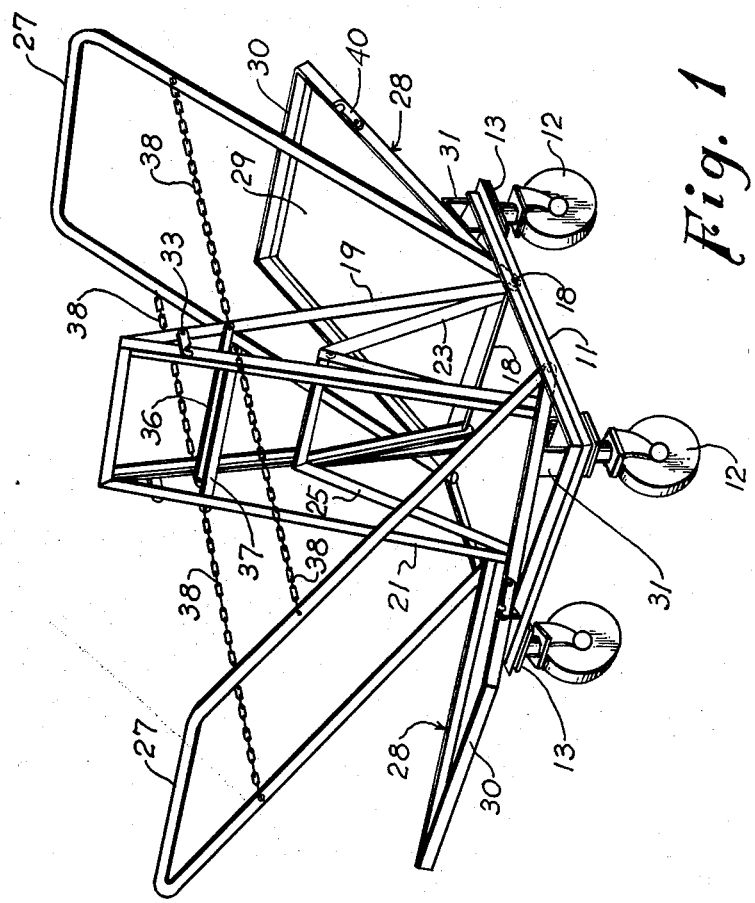
Figure 1 is a perspective view of a truck constructed in accordance with the present invention.

Referring to Figure 1, the numeral 11 indicates a rectangular dolly, preferably formed of welded angle bars, which is equipped at its four corners with swiveling rollers or casters 12. The casters are secured by suitable means to the underface of the dolly with the aid of mounting plates 13.

Lugs are provided along each side of the dolly 11, these lugs being arranged in two transversely aligned pairs. A transverse rod 18 extends through and is supported by each pair of lugs. Pivotally carried on one of said rods 18 and projecting upwardly from the dolly 11 are frame members 19 and 23. Respectively similar frame members 21 and 25 are pivotally carried on the other transverse rod 18. The members 19, 21, 23 and 25 may conveniently be formed by welding from metal stock having an L-shaped cross-section. As is readily apparent from the drawings, the members 19 and 21 cooperate when in contact to form a supporting frame or rest and the members 23 and 25 cooperate in the same manner to form a smaller rest or supporting frame. Both the frames thus formed project upwardly from the dolly between the rods 18.

Also carried by the dolly 11 are a pair of guard handles 27 and two loading platforms 28. The guard handles 27 are preferably formed of metal strip bent into a U and each is pivotally mounted on one of the transverse rods 18 at its extremities. Each loading platform 28 comprises a bottom 29 attached in suitable manner to a frame or border 30. The borders 30 may conveniently be constructed, like frame members 19, 21, 23, 25, of metal angle bars welded together with the respective flanges thereof projecting inwardly and upwardly. The platform bottoms 29 may be of sheet metal, fiber board, formed channels or other appropriate and desired material. The platforms 28 project outwardly beyond the ends of the dolly 11 when in lowered position and each one has its inner end mounted on one of the transverse rods 18 for pivotal movement about a horizontal axis.

When in lowered position each of the loading platforms 28 is supported, adjacent its outer end, upon a pair of upwardly projecting brackets 31 attached to the dolly 11 adjacent the corners thereof. The brackets 31 are preferably formed of bent metal strip welded to the frame of the dolly and are provided with inclined or bevelled upper faces. Thus the platforms 28 have a substantial area of contact with the brackets and are supported at a small angle to the dolly.

Adjacent its free, outer end the large frame member 19 carries a pivoted latch 33 that is adapted to engage a pin carried by the opposite corresponding frame member 21, thereby to hold the members together when in use. Intermediate their ends the frame members 19 and 21 are provided with transverse braces 36 and 37, respectively, the ends of which project outwardly beyond the sides of the members. Chains 38 are secured to the projecting ends of the braces 36 and 37 and to the sides of the associated guard handles 27. The length of the chains is such that, when the frame members 19 and 21 are secured together in erect position by the latch 33, the guard handles are held in partially raised position as illustrated in Figure 2.

Figure 2:
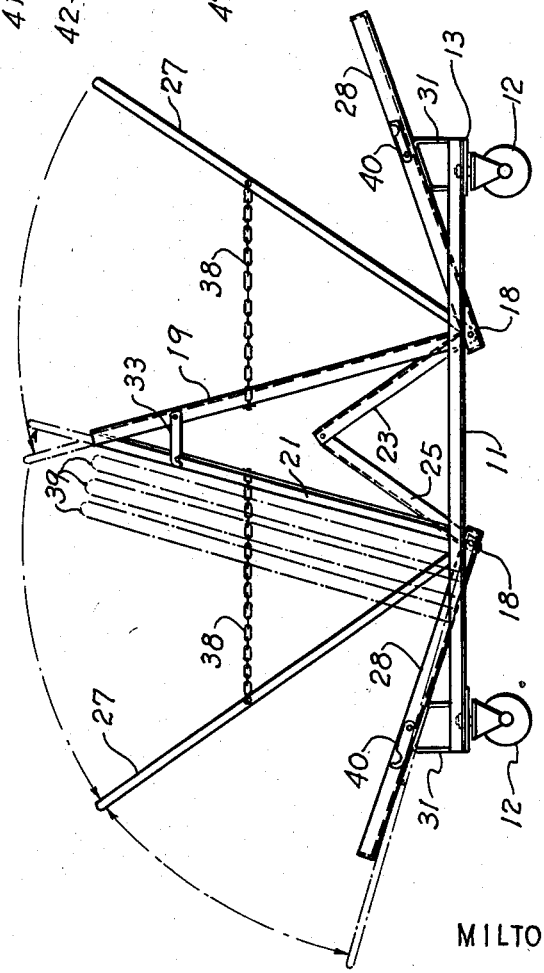
Figure 2 is a side elevation of the truck shown in Figure 1 illustrating the manner in which folding chairs are loaded thereon.

The manner in which a truck constructed in accordance with the present invention is used is indicated in Figure 2, a plurality of folded chairs 39 being shown resting in position against the supporting frame formed by the large frame members 19 and 21. As will be seen, the chairs 39 are supported on one of the loading platforms 28 in an inclined position so that there is no tendency for the chairs to slip or fall as they are stacked on the truck. It will be understood that chairs may also be carried on the other end of the truck stacked in a similar manner. When loaded, the truck may be easily pulled or pushed by the guard handles 27. At the same time the latter and the chains 38 prevent sidewise displacement of the chairs. It will be noted that the truck construction is such that one end only thereof may be loaded without danger of the truck tipping since the center of gravity is between the ends thereof.

If desired, chairs or similar objects may be loaded on the truck on their sides instead of on their ends. To permit this the frame members 19 and 21 that form the large supporting frame or rest are unlatched and folded down to rest within the loading platforms 28. The guard handles 27 are also lowered against the frame of the dolly. The folded chairs may then be stacked on the truck in an inclined position, the innermost chair on each end of the truck resting against the small supporting frame formed by the members 23 and 25.

As a result of the various portions of the truck other than the dolly being pivotally supported on the transverse rods 18 the truck is adapted for convenient storage in a minimum of space. Two methods of folding the several pivoted elements for storage are available. In accordance with the first method all of the parts may be folded upwardly by pivotal movement on the transverse rods 18 so that the horizontal space requirement is only that occupied by the dolly. When so folded latches 40 carried on the sides of the loading platforms 28 may be engaged with the braces 36 and 37 to hold the platforms elevated. Alternatively, if it is desired to store the truck under a low platform or shelf, the frame members 19, 21, 23 and 25 may be folded back and downwardly to rest against the loading platforms 28. The height of the truck is then only a little more than that of the dolly and very little head room is required to store it. When folded in this way a number of trucks may, if desired, be stacked, one on another. It will be evident that folding the truck for storage in either position or erecting it for use in transporting or storing folding chairs or the like can be done very quickly and easily.

Trucks constructed in accordance with the present invention possess a large number of advantages. It will be observed that, in addition to the ease with which such trucks may be stored when not in use, operation and use of the trucks is convenient. When chairs are being loaded or unloaded the guard handles 27 are either raised and resting against the frame formed by the members 19 and 21 or lowered to rest on the dolly 11. There are no side or end rails to impede loading or unloading. Chairs rest upright on the loading platform no matter how few or how many are on it. They slide naturally into proper position. Chairs of different shapes and sizes can be carried on the trucks and loaded either vertically or horizontally with equal ease. Although the trucks have a rigid construction and are very sturdy, their construction is simple and no expensive castings or special parts are required. Thus they may be economically produced.

Figure 3:
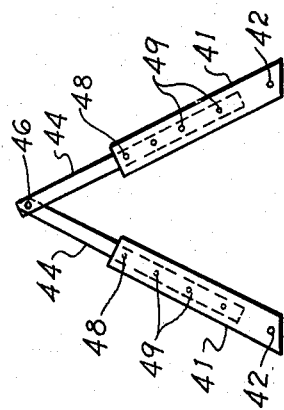
Figure 3 is a detail view showing a modification of a portion of the structure shown in Figure 2.
Figure 4:
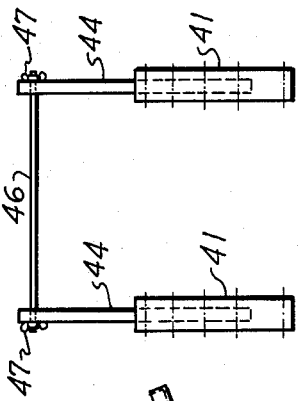
Figure 4 is an end view of the modification shown in Figure 3.

It is obvious that many changes in the construction described and illustrated may be made without departing from the spirit of the present invention. An example of such a modification is shown in Figures 3 and 4. The modification involves the use of only one chair rest or supporting frame, instead of the two shown in Figures 1 and 2, by providing telescoping or extensible members that permit adjustment of the height of the rest. In Figures 3 and 4 the numerals 41 designate tubes each of which is provided with a transverse opening 42 adjacent its lower end for pivotally mounting it on one of the transverse rods 18. Four of the tubes 41 would be used, each of the rods 18 having one tube mounted adjacent each end thereof, outwardly of the platform 28 and inwardly of the end of the guard handle 27. Slidably mounted in the bore of each of the tubes 41 is a rod or tube 44. At their upper ends the latter are provided with holes for pivotally securing them on a transverse rod or bar 46 which may be held in place by suitable means such, for example, as wing nuts 47 threaded on the outer ends thereof.

As will be evident, there will thus be provided a rest or supporting frame that is adjustable in height, eliminating the necessity of using both the large frame members 19, 21 and the small frame members 23, 25. At the same time the frame may be easily arranged for folding by removal of the transverse bar 46. Holes 48 are provided adjacent the upper ends of the tubes 41 and a plurality of spaced holes 49 adapted to align with the holes 48 are formed in the sliding rods or tubes 44. Adjustment to any of several positions may then be maintained by insertion of pins or the like (not shown) through aligned holes 48 and 49 in the several tubes and rods. The use of the truck with such an adjustable supporting frame would be substantially similar to the mode of operation heretofore described.

The modification above described is, of course, only one example of various changes and modifications that may be made. Thus, as another example, the wheels 12 at one end of the dolly may be made non-swiveling. In some cases maneuverability of the truck will thereby be improved. Accordingly, it is not intended that the invention shall be construed narrowly and limited to the precise construction illustrated and described, but it is intended that it should be given as broad an interpretation as permitted by the appended claims.

I claim:

1. In a truck of the character described a dolly, means for carrying a plurality of folding chairs or the like, said means comprising a pair of loading platforms which have their inner ends pivotally mounted on said dolly in spaced parallel relation and which, in loading position, extend outwardly beyond said dolly in opposite directions, and means comprising a pair of substantially rectangular frame member pivotally mounted on said dolly for forming a frame that extends upwardly between said platforms and has inclined sides to support folding chairs or the like stacked on either of said platforms.

2. In a truck of the character described a dolly, means for carrying a plurality of folding chairs or the like, said means comprising a pair of loading platforms which have their inner ends pivotally mounted on said dolly in spaced parallel relation and which, in loading position extend outwardly beyond said dolly in opposite directions, means comprising a pair of substantially rectangular frame members pivotally mounted on said dolly for forming a frame that extends upwardly between said platforms and has inclined sides to support folding chairs or the like stacked on either of said platforms and means comprising a pair of pivotally mounted guard handles, one associated with each of said platforms, for preventing dislodgment of chairs or the like carried on said platforms.

3. A truck of the character described as set forth in claim 2 in which each of said frame members is pivotally movable to rest against one of said platforms.

4. A truck of the character described as set forth in claim 2 in which each of said platforms is pivotally movable to a position resting on said frame and each of said frame members is pivotally movable to a position resting on one of said platforms.

5. A truck of the character described as set forth in claim 4 in which said platforms, when in loading position are inclined with respect to said dolly.

References Cited in the file of this patent

UNITED STATES PATENTS

| | | |
|---|---|---|
| 1,865,618 | Dahlman et al. | July 5, 1932 |
| 2,689,829 | Parker | Apr. 23, 1957 |